March 17, 1970     E. OCHYLSKI ET AL     3,500,494
AUTOMATIC RELEASING MECHANISM
Filed Oct. 19, 1967
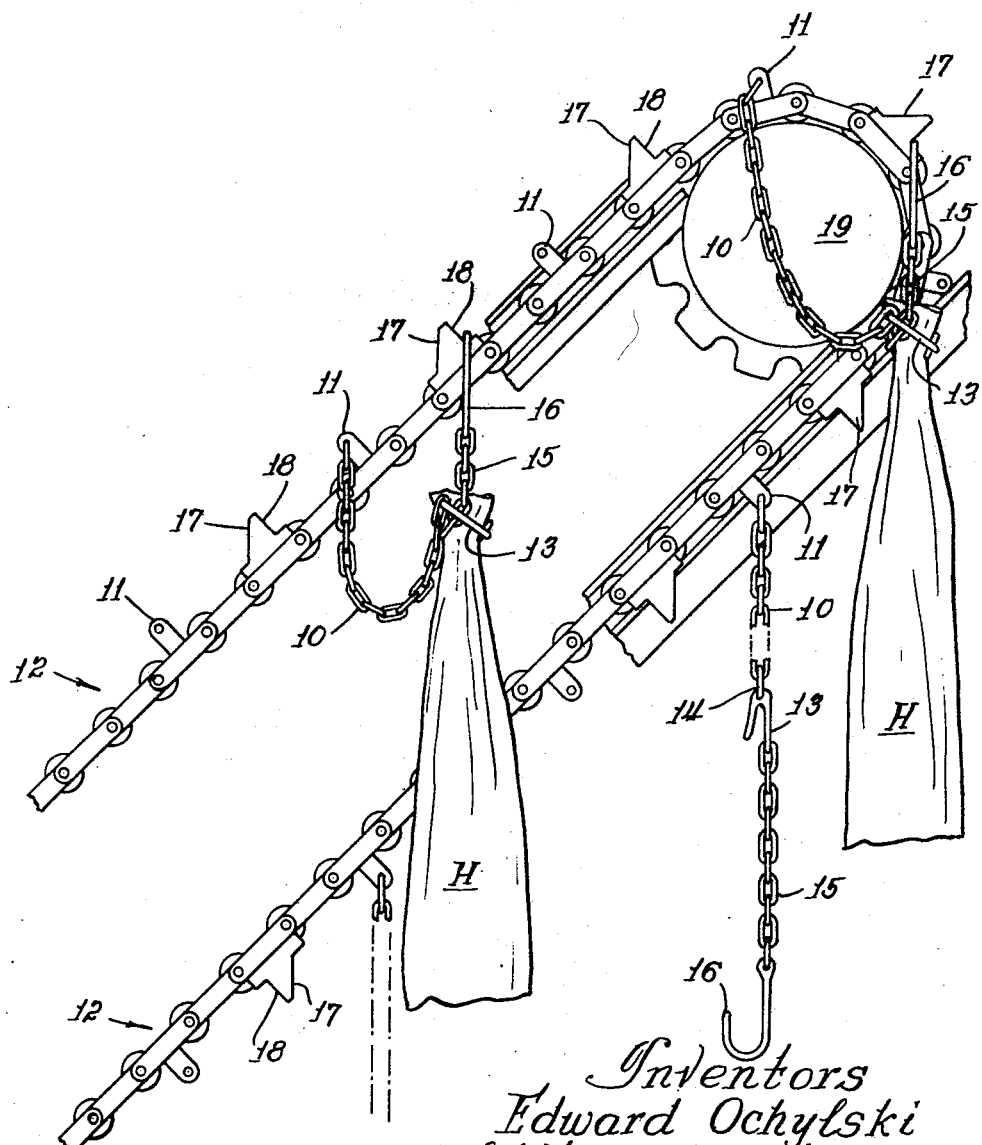
Inventors
Edward Ochylski
and Ernest A. Kopp
By George H. Simmons Atty.

3,500,494
AUTOMATIC RELEASING MECHANISM
Edward Ochylski, Chicago, and Ernest A. Kopp, Oak Lawn, Ill., assignors to The American Meat Packing Corporation, Chicago, Ill., a corporation of Illinois
Filed Oct. 19, 1967, Ser. No. 676,569
Int. Cl. A22b 5/16; C14b 17/08; A22c 15/00
U.S. Cl. 17—24                                                    7 Claims

ABSTRACT OF THE DISCLOSURE

Mechanism for attaching an article to an upwardly moving conveyor, which mechanism though permanently attacher to the conveyor automatically releases the article at the end of upward travel thereof.

---

This invention relates to mechanism for reducing manual operations required in a mechanized plant and has for its principal object the provision of a new and improved mechanism of this kind.

It is a main object of the invention to provide a mechanism for attaching to an upwardly moving source of power an article that is to be elevated by that source, which mechanism automatically releases the article from the source at the end of the elevating of the article.

Another object of the invention is to provide a mechanism for attaching the hide of an animal carcass to a dehider, which mechanism automatically releases the hide from the dehider and from the attaching mechanism upon completion of the removal of the hide from the carcass.

Another object of this invention is to provide an attaching mechanism having a section permanently attached to a dehider, a section adapted to be wrapped around the hide of an animal carcass and to be removably attached to the dehider and a mechanism disposed between said sections for maintaining the second section on said hide and for releasing the hide when that section is removed from the dehider by the force of gravity.

Further objects of the invention not specifically mentioned here will be apparent from the detailed description and claims which follow, reference being had to the accompanying drawing in which a preferred embodiment of the invention is shown by way of example and in which the single figure of the drawing shows the invention in conjunction with a dehider of the type shown in the copending application of Edward Ochylski, Ser. No. 571,079, filed Aug. 8, 1966.

Modern plants make extensive use of overhead conveyors on which various articles are conveyed from place to place in the plant. In butchering plants such conveyors are used to transport the carcasses of animals being butchered to the various stations where one or more butchering operations are performed. In many of such plants the hide of the animal, a hog for example, is preliminarily loosened and the loosend end attached to a dehider which pulls the hide off of the carcass. The carcass is suspended head down during butchering and the force applied to the hide to remove it from the carcass is an upwardly moving force.

In certain of the butchering plants the dehiding force is applied by upwardly inclined converoy chain to which a chain attached to the loosened portion of the hide is attached and the hide to be stripped from the carcass by the force thus applied to it. In other plants the force is applied by a winch type mechanism that exerts an upwardly directed force.

In both of these prior art arrangements after the hide is completely removed from the carcass the chain attaching it to the dehider is removed from the force applying portion of the dehider and must be manually removed from the hide before the chain can be used on another hide. The manual operation thus required limits the number of carcasses that can be dehided in a given time.

The present invention eliminates the manual operation of removing the chain from the hide and thus increases the number of carcasses that can be dehided in a given time.

In the preferred embodiment of the invention the chain by which the hide of the carcass is attached to the dehider mechanism consists of two sections, the first section being permanently attached to the dehider and the second section being attached to the hide and also removably attached to the dehider mechanism by a hook on the end of the section. Interposed between the two sections of the chain is a hook structure which initially performs the function of securing the second chain to the hide and subsequently enables the second chain to detach itself from the hook structure and thereby release the hide. Both chains and the hooks attached thereto remain attached to the dehider conveyor and if necessary can be sterilized while in route to the lower end of the conveyor at which point the second chain is attached to the hide on a carcass. The hide thus released from the mechanism falls by its own weight into the conveyance that is to carry it to the station where the next operation on the hide is to be performed. Since no manual operations are involved in releasing the hide from the dehider and from the chain, the number of carcasses that can be dehided in a given time is controlled by factors other than the removal of the detached hide from the dehider mechanism. As a result the capacity of the dehider is materially increased.

In the single figure of the drawing there is shown a portion of the conveyor of a dehider of the type shown in the above mentioned copending application and the apparatus of the present invention is shown in conjunction therewith.

The conveyor 12 which is an endless chain conveyor, the upper race of which moves upwardly, is equipped with a plurality of lugs 11 to which one end of a chain 10 is permanently attached. The distal end of the chain 10 is attached to the closed end of a U-shaped hook 13 in the manner indicated at 14. A second chain 15 is attached to the longer arm of the hook 13 and carries at its distal end a second hook 16.

In use the chain 15 is wrapped around a portion of the hide of the carcass which has been previously released therefrom. The chain is fixed upon the hide by engaging one of the links in the U-shaped slot in the hook 13 and the hook 16 is then engaged with a surface 18 of lug 17 carried upon the conveyor 12 in advance of the lug 11, which surface 18 is then disposed substantially parallel to the upper race of the conveyor.

With the hook 16 so attached to the conveyor the force exerted on the chain 15 by the upward movement of the conveyor is transmitted to the hide to pull that hide off of the carcass. This force maintains the link of chain 15 engaged in the slot in hook 13 tightly against the closed end of that slot notwithstanding that the hook slopes downwardly. It will be noted that at this time the chain 10 is slack and that the hook 13 is disposed at an angle with respect to the chain 15.

As the lug 17 passes over the sprocket wheel 19 at the upper end of the conveyor 12, the surface 18 is rotated and ultimately approaches a vertical position. The weight of the hide H which has now been completely removed from the carcass pulls the hook 16 off of the surface 18 and starts to fall from the conveyor. Descent of the hide is halted momentarily with a jerk as chain 10 pulls tight and supports the weight of the hide. The porion of chain 15 and the hook 16 continue to fall and his descent pulls the link in the U-slot in hook 13 out of that solt thus freeing the chain from the hide. Chains 10 and 15 ultimately move into the vertically aligned position shown in the drawing.

Thus it will be seen that the force of gravity is utilized first to detach the removable hook 16 from the conveyor 12 and subsequently to cause the hook 16 to detach the link of the chain engaged in the slot in hook 13 from that slot. The hide thus released falls into the conveyance that is to carry it to the station at which the next operation on the hide is to be performed.

From the foregoing it will be apparent that the automatic release of the hide from the conveyor and also from the attaching chains while retaining those chains attached to the conveyor eliminates all manual operation at this point in the operation. The number of carcasses that can be dehinded in a given time can be increased as a result.

While we have chosen to show and describe our invention as applied to a dehider in a butchering plant, we have done so by way of example only as the teachings of the invention can be put to other uses and such is contemplated, and we are not to be limited by the example shown but rather only by the scope of the appended claims.

What is claimed is:

1. Apparatus for connecting an article to an upwardly moving source of power that is an endless chain conveyor that travels upwardly in its upper race, turns over a sprocket wheel at its uppermost point and travels downwardly in its lower race, and for releasing the article from said source upon completion of the upward movement of the article, the improvement comprising:
    (a) a first chain permanently attached to first spaced apart lugs with which the conveyor is equipped;
    (b) a second chain permanently attached to said first chain and adapted to be attached to an article and removably attached to second lugs disposed between said first lugs on the conveyor;
    (c) hook means disposed between said first and second chains adapted to secure the second chain on the article and to release the chain therefrom upon removal of the second chain from the conveyor.

2. Apparatus as specified in claim 1 in which the second chain carries a hook on its free end which hook is engaged with said second lugs to removably attach the chain to the conveyor.

3. Apparatus as specified in claim 2 in which the second lugs each contain a surface that is engaged by the second chain hook which surface is inclined upwardly in the first race and is turned in to vertical position as the lug moves over the sprocket wheel to permit the weight of the article to pull the hook off of the lug.

4. Apparatus as specified in claim 3 in which on removal of the hook from the second lug the weight of the article is transferred to the first chain momentarily to enable said hook and article to release the second chain from the article.

5. Apparatus as specified in claim 1 in which the hook means includes a U-shaped hook to the closed end of which the first chain is attached and to the end of one arm of which the second chain is attached.

6. Apparatus as specified in claim 5 in which the second chain is secured upon the article by positioning of one of its links in the U-shaped opening in the hook means.

7. Apparatus as specified in claim 6 in which force is applied to the article only through the second chain during upward movement of the article which force maintains the engaged link of the chain securely against the closed end of the slot in the hook means.

References Cited

UNITED STATES PATENTS

| | | | |
|---|---|---|---|
| 233,698 | 10/1880 | Rankin | 17—24 |
| 570,025 | 10/1896 | Slattery | 17—24 |
| 3,210,802 | 10/1965 | Gray | 17—44.3 |

RICHARD E. AEGERTER, Primary Examiner

UNITED STATES PATENT OFFICE
CERTIFICATE OF CORRECTION

Patent No. 3,500,494                      March 17, 1970

Edward Ochylski et al.

It is certified that error appears in the above identified patent and that said Letters Patent are hereby corrected as shown below:

In the heading to the printed specification, lines 4 and 5, "assignors to The American Meat Packing Corporation, Chicago, Ill., a corporation of Illinois" should read -- assignors, by mesne assignments, to Edward Ochylski, Chicago, Illinois --.

Signed and sealed this 15th day of December 1970.

(SEAL)
Attest:

Edward M. Fletcher, Jr.                      WILLIAM E. SCHUYLER, JR.
Attesting Officer                             Commissioner of Patents